(12) United States Patent
Lee et al.

(10) Patent No.: US 11,404,733 B2
(45) Date of Patent: Aug. 2, 2022

(54) ELECTRODE ASSEMBLY, SECONDARY BATTERY COMPRISING THE SAME, AND BATTERY PACK

(71) Applicant: LG Chem, Ltd., Seoul (KR)

(72) Inventors: Han Young Lee, Daejeon (KR); Kyung Min Lee, Daejeon (KR)

(73) Assignee: LG Energy Solution, Ltd.

( * ) Notice: Subject to any disclaimer, the term of this patent is extended or adjusted under 35 U.S.C. 154(b) by 124 days.

(21) Appl. No.: 16/757,585

(22) PCT Filed: Jul. 23, 2019

(86) PCT No.: PCT/KR2019/009048
§ 371 (c)(1),
(2) Date: Apr. 20, 2020

(87) PCT Pub. No.: WO2020/071623
PCT Pub. Date: Apr. 9, 2020

(65) Prior Publication Data
US 2021/0083341 A1 Mar. 18, 2021

(30) Foreign Application Priority Data
Oct. 5, 2018 (KR) .................. 10-2018-0118864

(51) Int. Cl.
*H01M 10/654* (2014.01)
*H01M 10/613* (2014.01)
*H01M 10/623* (2014.01)
*H01M 10/637* (2014.01)
*H01M 10/647* (2014.01)

(52) U.S. Cl.
CPC ....... *H01M 10/654* (2015.04); *H01M 10/613* (2015.04); *H01M 10/623* (2015.04);
(Continued)

(58) Field of Classification Search
CPC ............ H01M 10/654; H01M 10/613; H01M 10/637; H01M 10/647; H01M 10/623
See application file for complete search history.

(56) References Cited

U.S. PATENT DOCUMENTS

2011/0052964 A1    3/2011    Kim et al.
2013/0130075 A1    5/2013    Kim et al.
(Continued)

FOREIGN PATENT DOCUMENTS

JP    2002203562 A    7/2002
JP    2007053055 A    3/2007
(Continued)

OTHER PUBLICATIONS

International Search Report for PCT/KR2019/009048 dated Oct. 31, 2019; 2 pages.
(Continued)

*Primary Examiner* — Karie O'Neill Apicella
(74) *Attorney, Agent, or Firm* — Lerner, David, Littenberg, Krumholz & Mentlik, LLP (57) ABSTRACT

The present invention provides an electrode assembly comprising: a radical unit provided with first and second electrodes stacked with a separator therebetween, wherein the first electrode is stacked at the outermost side; and a safety unit disposed on the outermost surface of the radical unit, wherein the safety unit comprises: a first safety plate disposed above the outermost surface of the radical unit; and a first semiconductor material provided between the radical unit and the first safety plate, wherein the first semiconductor material changes from an insulator to a conductor at the first set temperature or more to connect the radical unit to the first safety plate, thereby dissipating heat of the radical unit while conducting the heat to the first safety plate.

14 Claims, 5 Drawing Sheets

(52) U.S. Cl.
CPC ....... *H01M 10/637* (2015.04); *H01M 10/647* (2015.04); *H01M 2200/10* (2013.01); *H01M 2220/30* (2013.01)

(56) References Cited

U.S. PATENT DOCUMENTS

| | | | | |
|---|---|---|---|---|
| 2015/0099163 | A1* | 4/2015 | Kim | H01M 50/183 |
| | | | | 429/178 |
| 2015/0180089 | A1* | 6/2015 | Min | H01M 10/0413 |
| | | | | 429/94 |

FOREIGN PATENT DOCUMENTS

| | | | |
|---|---|---|---|
| JP | WO2014148585 | A1 | 2/2017 |
| KR | 20010077684 | A | 8/2001 |
| KR | 100670485 | B1 | 1/2007 |
| KR | 20100032059 | A | 3/2010 |
| KR | 100958649 | B1 | 5/2010 |
| KR | 101014817 | B1 | 2/2011 |
| KR | 20130004153 | A | 1/2013 |
| KR | 20140008233 | A | 1/2014 |
| KR | 20160118684 | A * | 10/2016 |
| KR | 20160118684 | A | 10/2016 |
| KR | 20170139305 | A * | 12/2017 |
| KR | 20170139305 | A | 12/2017 |

OTHER PUBLICATIONS

Amirkoushyar Ziabari, et al., Adaptive Power Blurring Techniques to Calculate IC Temperature Profile under Large Temperature Variations, ResearchGate, Sep. 2010, 7 pages, XP055761028.

Extended European Search Report including Written Opinion for Application No. EP19868935.8 dated Jan. 12, 2021, 5 pages.

* cited by examiner

ELECTRODE ASSEMBLY, SECONDARY BATTERY COMPRISING THE SAME, AND BATTERY PACK

CROSS-REFERENCE TO RELATED APPLICATION

The present application is a national phase entry under 35 U.S.C. § 371 of International Patent Application No. PCT/KR2019/009048, filed on Jul. 23, 2019, published in Korean, which claims priority from Korean Patent Application No. 10-2018-0118864, filed on Oct. 5, 2018, the disclosures of which are hereby incorporated by reference in their entireties.

TECHNICAL FIELD

The present invention relates to an electrode assembly, a secondary battery comprising the same, and a battery pack, and more particularly, to an electrode assembly having improved safety, a secondary battery comprising the same, and a battery pack.

BACKGROUND ART

In generally, secondary batteries are chargeable and dischargeable batteries unlike primary batteries that are not chargeable. Such secondary batteries are being used in high-tech electronic devices such as cellular phones, laptop computers, camcorders, and the like.

These secondary batteries are classified into a can-type secondary battery in which an electrode assembly is embedded in a metal can and a pouch-type secondary battery in which an electrode assembly is embedded in a pouch. The pouch-type secondary battery comprises an electrode assembly in which electrodes and separators are alternately stacked, an electrolyte, and a pouch that accommodates the electrode assembly and the electrolyte. Also, the pouch comprises an accommodation part that accommodates the electrode assembly and the electrolyte and a sealing part that seals the accommodation part.

However, there has been a problem in which the temperature of the secondary batteries rises rapidly to cause ignition or explosion when short-circuit occurs due to overcharging or external impact.

DISCLOSURE OF THE INVENTION

Technical Problem

The present invention has been made to solve the above-described problem, and an objective of the present invention is to provide an electrode assembly of which a temperature is prevented from rising to a set temperature or more to prevent ignition or explosion from occurring, a secondary battery comprising the same, and a battery pack.

Technical Solution

An electrode assembly according to the present invention in order to achieve the objective may comprise: a radical unit provided with first and second electrodes stacked with a separator therebetween, wherein the first electrode is stacked at the outermost side; and a safety unit disposed on the outermost surface of the radical unit, wherein the safety unit comprises: a first safety plate disposed above the outermost surface of the radical unit; and a first semiconductor material provided between the radical unit and the first safety plate, wherein the first semiconductor material serves as an insulator at a first set temperature or less to disconnect the radical unit to the first safety plate and changes from the insulator to a conductor at the first set temperature or more to connect the radical unit to the first safety plate, thereby dissipating heat of the radical unit while conducting the heat to the first safety plate.

The first set temperature may be 60° C. to 80° C.

The separator may have an area greater than that of the electrodes, the first semiconductor material may have the same area as the semiconductor, and the first safety plate may have the same area as the first or second electrode.

The safety unit may further comprise: a second safety plate disposed outside the first safety plate; and a second semiconductor material provided between the first safety plate and the second safety plate, wherein the second semiconductor material serves as an insulator at a second set temperature or less to disconnect the first safety plate from the second safety plate and changes from the insulator to a conductor at the second set temperature or more to connect the first safety plate to the second safety plate, thereby dissipating heat of the first safety plate while conducting the heat to the second safety plate.

The second set temperature may be 80° C. to 100° C.

The first safety plate may be made of an aluminum (Al) material, and the second safety plate is made of a copper (Cu) material.

The second semiconductor material may have the same size as the first semiconductor material, and the second safety plate may have a size greater than that of the first safety plate and less than or equal to that of the second semiconductor material.

The second safety plate may have a thickness greater than that of the first safety plate.

Each of the first semiconductor material and the second semiconductor material may be made of germanium or silicon.

Also, a secondary battery according to the present invention may comprise: an electrode assembly; and a case configured to accommodate the electrode assembly, wherein the electrode assembly comprises: a radical unit provided with first and second electrodes stacked with a separator therebetween, wherein the first electrode is stacked at the outermost side; and a safety unit disposed on the outermost surface of the radical unit, wherein the safety unit comprises: a first safety plate disposed above the outermost surface of the radical unit; and a first semiconductor material provided between the radical unit and the first safety plate, wherein the first semiconductor material serves as an insulator at a first set temperature or less to disconnect the radical unit to the first safety plate and changes from the insulator to a conductor at the first set temperature or more to connect the radical unit to the first safety plate, thereby dissipating heat of the radical unit while conducting the heat to the first safety plate.

The safety unit may further comprise: a second safety plate disposed outside the first safety plate; and a second semiconductor material provided between the first safety plate and the second safety plate, wherein the second semiconductor material serves as an insulator at a second set temperature or less to disconnect the first safety plate from the second safety plate and changes from the insulator to a conductor at the second set temperature or more to connect the first safety plate to the second safety plate, thereby dissipating heat of the first safety plate while conducting the heat to the second safety plate.

The electrode assembly may comprise: a first electrode lead connected to the first electrode and having an end drawn to the outside of the case; and a second electrode lead connected to the second electrode and having an end drawn to the outside of the case, and the electrode assembly may further comprise a third semiconductor material between the first electrode lead and the second electrode lead, wherein the third semiconductor material serves as an insulator at a third set temperature or less to disconnect the first electrode lead from the second electrode lead and changes from the insulator to a conductor at the third set temperature or more to connect the first electrode lead to the second electrode lead, thereby generating short-circuit.

The third set temperature may be 100° C. to 110° C.

Also, a battery pack according to the present invention may comprise a secondary battery provided with an electrode assembly and a case configured to accommodate the electrode assembly, wherein the electrode assembly comprises: a radical unit provided with first and second electrodes stacked with a separator therebetween, wherein the first electrode is stacked at the outermost side; and a safety unit disposed on the outermost surface of the radical unit, wherein the safety unit comprises: a first safety plate disposed above the outermost surface of the radical unit; and a first semiconductor material provided between the radical unit and the first safety plate, wherein the first semiconductor material serves as an insulator at a first set temperature or less to disconnect the radical unit to the first safety plate and changes from the insulator to a conductor at the first set temperature or more to connect the radical unit to the first safety plate, thereby dissipating heat of the radical unit while conducting the heat to the first safety plate.

Advantageous Effects

The electrode assembly according to the present invention may comprise the radical unit and the safety unit provided with the first safety plate and the first semiconductor material. Therefore, when the temperature of the electrode assembly rises to the first set temperature or more, the rise in temperature of the electrode assembly may be suppressed by the safety unit to prevent the electrode assembly from being ignited and exploded.

That is, when the temperature of the electrode assembly is maintained at the first set temperature or less, the safety unit may disconnect the radical unit from the first safety plate through the first semiconductor material, which is the insulator. On the other hand, when the temperature of the electrode assembly rises to the first set temperature or more, the first semiconductor material, which is the insulator, may change into to the conductor to connect the radical unit to the first safety plate. Accordingly, the heat generated in the radical unit may be conducted to the first safety plate and then dissipated. As a result, the temperature of the electrode assembly may be prevented from rising to the first set temperature or more, thereby preventing the ignition and explosion from occurring.

Also, the safety unit according to the present invention may comprise the second safety plate and the second semiconductor material. Here, the second semiconductor material may change into the conductor at the temperature greater than that of the first semiconductor material. Therefore, when the temperature of the electrode assembly rises to the second set temperature or more, the second semiconductor material, which is the insulator, may change into the conductor to connect the first safety plate to the second safety plate. Accordingly, the heat of the radical unit may be conducted to the first and second safety plates and then dissipated. As a result, the temperature of the electrode assembly may be prevented from rising to the second set temperature or more.

Also, the safety unit according to the present invention may comprise the third semiconductor material. Here, the third semiconductor material may change into the conductor at the temperature greater than that of the second semiconductor material. Therefore, when the temperature of the electrode assembly rises to the third set temperature or more, the third semiconductor material, which is the insulator, may change into the conductor to connect the first electrode lead to the second electrode lead, thereby generating the short-circuit. Accordingly, the temperature of the electrode assembly may be prevented from rising to the third set temperature or more, thereby preventing the ignition and explosion from occurring.

MODE FOR CARRYING OUT THE INVENTION

Hereinafter, preferred embodiments of the present invention will be described in detail with reference to the accompanying drawings so as to be easily carried out by a person skilled in the art to which the present invention pertains. The present invention may, however, be embodied in different forms and should not be construed as limited to the embodiments set forth herein. In the drawings, anything unnecessary for describing the present invention will be omitted for clarity, and also like reference numerals refer to like elements throughout.

[Electrode Assembly According to First Embodiment of the Present Invention]

Figure 1:
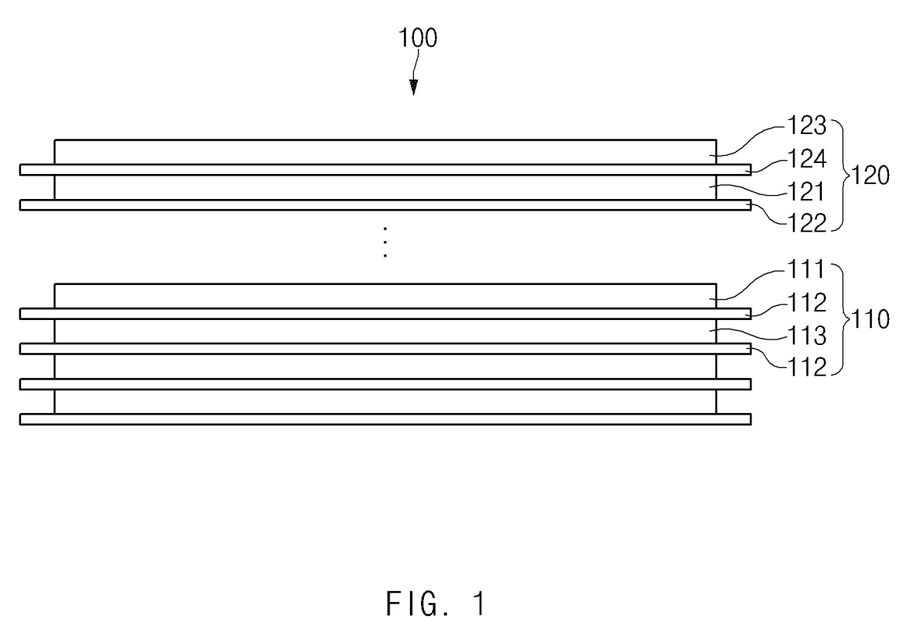
FIG. 1 is a cross-sectional view of an electrode assembly according to a first embodiment of the present invention.
Figure 2:
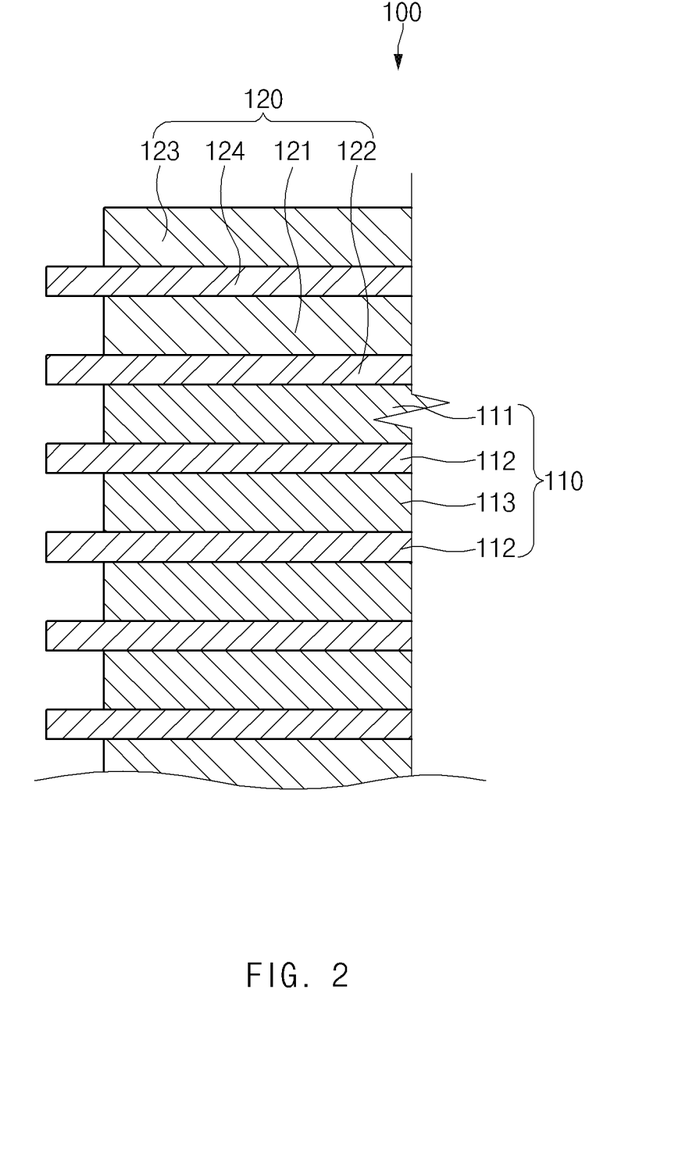
FIG. 2 is a partially enlarged view of FIG. 1.

An electrode assembly 100 according to a first embodiment of the present invention comprises a radical unit 110 and a safety unit 120 disposed on the outermost surface of the radical unit 110 as illustrated in FIGS. 1 and 2.

The radical unit 110 is provided with first and second electrodes, which are stacked with a separator therebetween. Here, the first electrode is stacked at the outermost side.

For example, referring to FIG. 1, the radical unit 110 comprises first electrodes 111 and the second electrodes 113, which are alternately stacked in a direction from the top to the bottom, and a separator 112 disposed between each of the first electrodes 111 and each of the second electrodes 113.

The first electrode 111 comprises a first collector and a first electrode active material applied on a surface of the first collector, and The second electrode 113 comprises a second collector and a second electrode active material applied on a surface of the second collector.

Here, the first electrode may be a negative electrode, and the second electrode may be a positive electrode. Also, the first collector is made of a copper (CU) material, and a second collector made of an aluminum (Al) material.

The safety unit 120 is configured to suppress a rise in temperature of the radical unit and comprises a first safety plate 121 disposed above the outermost surface of the radical unit 110 and a first semiconductor material 122 provided between the radical unit 110 and the first safety plate 121.

The first safety plate 121 is configured to suppress the rise in temperature of the radical unit and is made of a metal or non-metal having thermal conductivity. Preferably, the first safety plate 121 may be made of an aluminum (Al) material. That is, when the temperature of radical unit 110 rises, the first safety plate 121 may absorb heat of the radical unit to dissipate the heat to the outside, thereby capable of suppressing the rise in temperature of the radical unit. In particular, since the aluminum is a material having superior electrical conductivity, the heat generated in the radical unit may be effectively absorbed and dissipated.

Also, the first safety plate 121 may be made of the same material as the collector of the second electrode 113.

The first semiconductor material 122 is disposed between the radical unit 110 and the first safety plate 121 to electrically connect the radical unit 110 to the first safety plate 121 or electrically disconnect the radical unit 110 from the first safety plate 121 according to the temperature variation.

That is, the first semiconductor material 122 is maintained as an insulator to disconnect the radical unit 110 from the first safety plate 121 when the temperature of the radical unit 110 is maintained at a first set temperature or less. Here, even when the heat is generated in the radical unit 110, the heat is not conducted to the first safety plate 121. Also, when the temperature of the radical unit 110 rises to the first set temperature or more, the first semiconductor material 122 may change from the insulator to a conductor to connect the radical unit 110 to the first safety plate 121 so that current flows. Accordingly, the heat generated in the radical unit 110 may be conducted to the first safety plate 121 and then dissipated. As a result, the temperature of the radical unit 110 may be prevented from rising to the first set temperature or more.

In other words, the first semiconductor material 122 may connect or disconnect the radical unit 110 to/from the first safety plate 121 according to the temperature variation of the radical unit 110. As a result, the rise in temperature of the radical unit 110 may be effectively suppressed.

Here, the first set temperature may be 60° C. to 80° C. Preferably, the first set temperature may be 80° C. That is, a change (that is, contraction) occurs in the separator 112 of the radical unit 110 at the temperature of 60° C. to 80° C., preferably, 80° C. In this case, the possibility of occurrence of short-circuit increases. When the first set temperature is set to 60° C. to 80° C. so as to prevent the above, the temperature of the radical unit 110 may be prevented from rising to 60° C. to 80° C. or more. Accordingly, the separator 112 may be previously prevented from changing to reduce the possibility of occurrence of the short-circuit.

Also, the separator 112 has an area larger than that of each of the first and second electrodes 111 and 113, and the first semiconductor material 122 has the same area as the separator 112. That is, since the first semiconductor material 122 has the same area as the separator 112, the radical unit 110 and the first safety plate 121 may be separated from each other so that the current does not flow between the radical unit 110 and the first safety plate 121 at the first set temperature or less.

Also, the semiconductor material 122 may have the same thickness as the separator 112 to minimize an increase in thickness of the electrode assembly 100.

Also, the first safety plate 121 has the same area as each of the first and second electrodes 111 and 113 and has an area less than that of the first semiconductor material 122. Accordingly, even when a skew fail occurs between the radical unit 110 and the first safety plate 121, the radical unit 110 and the first safety plate 121 may be prevented from being connected to each other.

Also, the first safety plate 121 has a thickness greater than that of each of the first electrode and the second electrode. Accordingly, heat dissipation performance of the first safety plate 121 may increase significantly. As a result, the heat generated in the radical unit 110 may be rapidly absorbed and then dissipated to the outside.

Also, the first semiconductor material 122 may be made of a phase transition material that changes from an insulator to a conductor, and the phase transition material may be germanium or silicon. The germanium and the silicon are semiconductors and have a feature in which electrons move at a predetermined temperature. Here, referring to FIG. 5, the germanium that is the semiconductor has high resistance because vibratory motion of atoms are significantly reduced at a low temperature. Accordingly, the germanium may serve as an insulator. Also, when the temperature rises, the resistance is reduced while the vibratory motion of the atoms increases. Accordingly, the insulator is changed into the conductor to allow the current to flow well therethrough. In summary, the first semiconductor material 122 has the characteristics as the insulator at a low temperature and has a property of changing into the conductor at a high temperature.

The safety unit 120 having the above-described constituents may comprise the first safety plate 121 and the first semiconductor material 122 to prevent the temperature of the radical unit 110 from rising to the first set temperature or more. As a result, the electrode assembly 110 may be prevented from being ignited or exploded.

Also, the safety unit 120 further comprises a second safety plate 123 disposed on an outer surface of the first safety plate 121 and a second semiconductor material 124 provided between the first safety plate 121 and the second safety plate 123. That is, if the first safety plate 121 and the first semiconductor material 122 do not suppress the rise in temperature of the radical unit 110, the safety unit 120 may suppress again the rise in temperature of the radical unit 110 by using the second safety plate 123 and the second semiconductor material 124.

In more detail, when the heat of the first safety plate 121 is conducted to the second safety plate 123, the second safety plate 123 dissipates the heat generated in the radical unit together with the first safety plate 121 to suppress the rise in temperature of the radical unit 110.

Here, the second safety plate 123 is made of a metal or non-metal having thermal conductivity, preferably, a copper (Cu) material. That is, the copper (Cu) has conductivity higher than that of the aluminum. Accordingly, the heat generated in the radical unit may be effectively absorbed and then dissipated to the outside. As a result, the rise in temperature of the radical unit 110 may be significantly suppressed.

Particularly, the second safety plate 123 may be made of the same material as the first collector of the first electrode 111.

The second semiconductor material 124 is disposed between the first safety plate 121 and the second safety plate 123 to connect or disconnect the first safety plate 121 to/from the second safety plate 123 according to the temperature variation.

That is, when the temperature of the radical unit 110 is maintained at the second set temperature or less, the second semiconductor material 124 may serve as the insulator to disconnect the first safety plate 121 from the second safety plate 123. Also, when the temperature of the radical unit 110 rises to the second set temperature or more, the second semiconductor material 124 may change from the insulator to the conductor to connect the first safety plate 121 to the second safety plate 123 so that the current flows. Accordingly, the heat of the first safety plate 121 is conducted to the second safety plate 123 and then dissipated. In other words, the heat generated in the radical unit 110 may be conducted to the first safety plate 121 and the second safety plate 123 to suppress the temperature of the radical unit 110 to significantly prevent the electrode assembly from being ignited and exploded.

Also, the second set temperature is higher than the first set temperature. For example, the second set temperature may be 80° C. to 100° C. Preferably, the second set temperature may be 100° C. That is, the possibility of ignition in the radical unit 110 due to the change of the separator 112 may increases at the temperature of 80° C. to 100° C., preferably, 100° C. Accordingly, when the second set temperature is set to 80° C. to 100° C., the temperature of the radical unit may be prevented from rising to 80° C. to 100° C. or more. As a result, the ignition of the electrode assembly may be prevented.

Also, the second semiconductor material 124 may be made of a material having a phase transition temperature higher than that of the first semiconductor material 122. This is done for preventing the phase transition of the second semiconductor material 124, even when the phase transition of the first semiconductor material 122 occurs. That is, each of the second semiconductor material 124 and the first semiconductor material 122 is made of germanium or silicon. Here, the second semiconductor material 124 contains additional compounds and thus has a phase transition temperature higher than that of the first semiconductor material 122.

Also, the second semiconductor material 124 has the same size as the first semiconductor material 122. Here, the second safety plate 123 has a size greater than that of the first safety plate 121 and less than or equal to that of the second semiconductor material 124. Thus, the electrode assembly may be prevented from increasing in volume and also prevent the first safety plate 121 and the second safety plate 123 from being connected to each other at the second set temperature or less.

Also, the second safety plate 123 has a thickness greater than that of the first safety plate 121. Accordingly, the second safety plate 123 has heat dissipation performance higher than that of the first safety plate 121 to more stably reduce the temperature of the radical unit 110.

Therefore, the electrode assembly 100 according to the first embodiment of the present invention may comprise the safety unit 120 to suppress the rise in temperature of the radical unit, thereby preventing the radical unit from being ignited and exploded.

Hereinafter, in describing another embodiment according to the present invention, constituents having the same configuration and function have been given with the same reference numerals, and thus their duplicated descriptions will be omitted.

[Secondary Battery According to Second Embodiment of the Present Invention]

Figure 3:
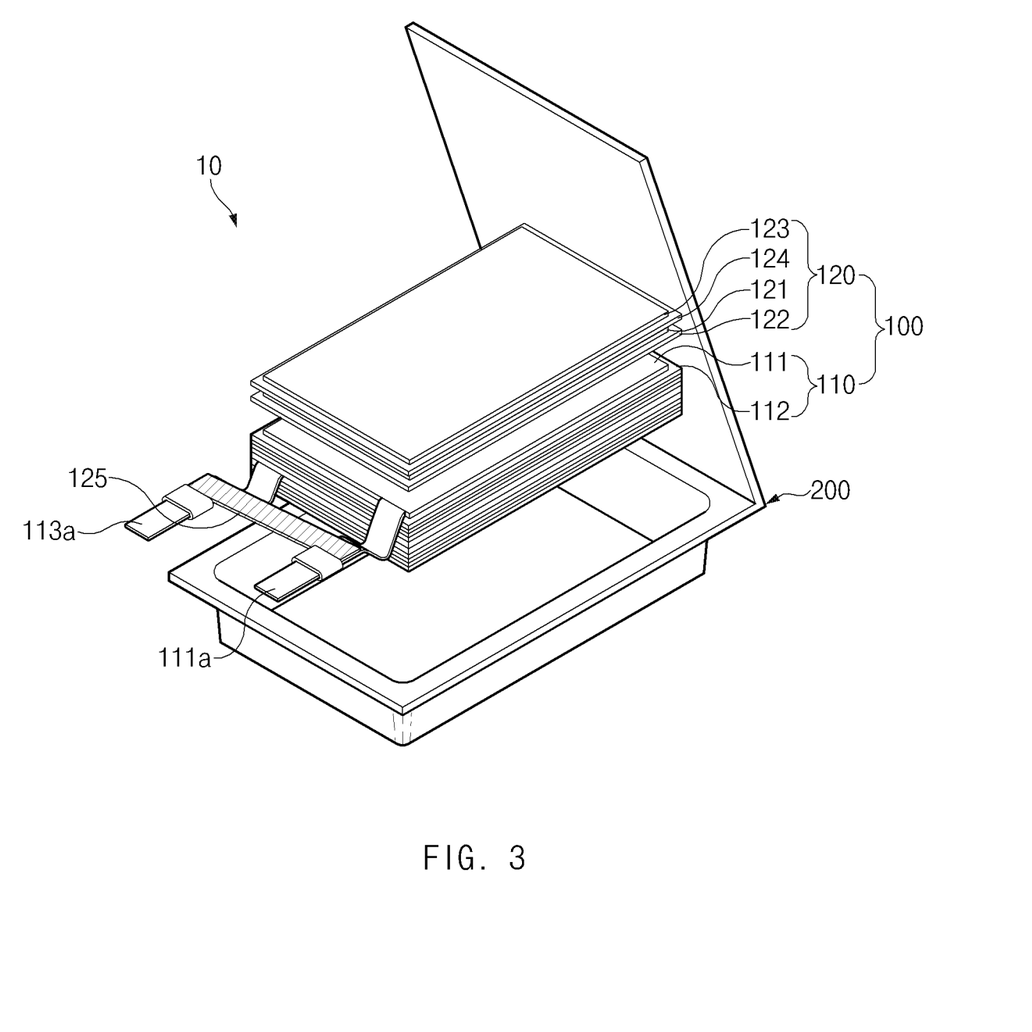
FIG. 3 is a perspective view of a secondary battery according to a second embodiment of the present invention.

A secondary battery 10 according to a second embodiment of the present invention comprises an electrode assembly 100 and a case that accommodates the electrode assembly 100 as illustrated in FIG. 3.

The electrode assembly 100 comprises a radical unit 110 which comprises first and second electrodes 111 and 113 stacked with a separator 112 therebetween, wherein the first electrode 111 is stacked at the outermost side, and a safety unit 120 disposed on the outermost surface of the radical unit 110.

The safety unit 120 comprises a first safety plate 121 disposed above the outermost surface of the radical unit 110 and a first semiconductor material 122 provided between the radical unit 110 and the first safety plate 121.

Here, the first semiconductor material 122 may serve as an insulator at a first set temperature or less to disconnect the radical unit 110 from the first safety plate 121 and may change from the insulator to a conductor at the first set temperature or more to connect the radical unit 110 to the first safety plate 121 so that the radical unit 110 and the first safety plate 121 are electrically conducted with respect to each other. Thus, heat of the radical unit 110 is conducted to the first safety plate 121 and then dissipated.

Also, the safety unit 120 further comprises a second safety plate 123 disposed on an outer surface of the first safety plate 121 and a second semiconductor material 124 provided between the first safety plate 121 and the second safety plate 123. That is, in the safety unit 120, when the temperature of the radical unit 110 is below a second set temperature, the second semiconductor material 124 may serve as the insulator to disconnect the first safety plate 121 from the second safety plate 123, and when the temperature of the radical unit 110 is above the second set temperature, the second semiconductor material 124 may change from the insulator to the conductor to connect the first safety plate 121 to the second safety plate 123 so that the first safety plate 121 and the second safety plate 123 are conducted with respect to each other. Thus, the heat of the first safety plate 121 is conducted to the second safety plate 123 to prevent a rise in temperature of the electrode assembly.

The case 200 comprises an accommodation part that accommodates the electrode assembly 100 and a sealing part that seals the accommodation part.

Figure 4:
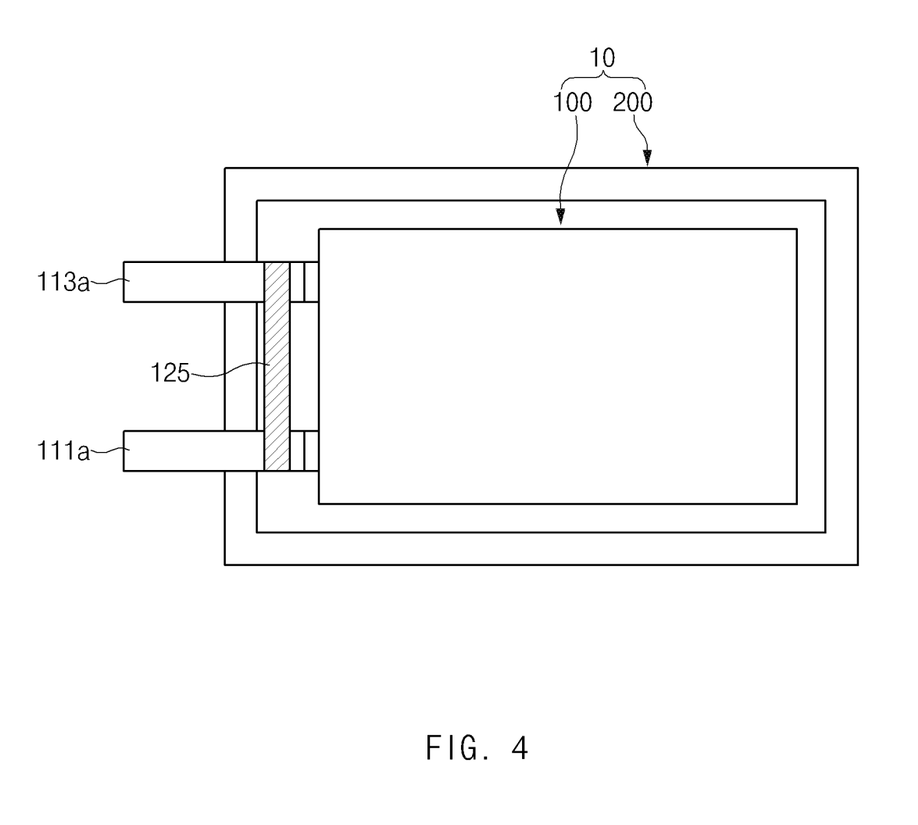
FIG. 4 is a plan view illustrating the secondary battery according to the second embodiment of the present invention.

Also, the electrode assembly 100 comprises a first electrode lead 111a connected to the first electrode 111 and having an end that is drawn to the outside of the case 200 and a second electrode lead 113a connected to the second electrode 113 and having an end that is drawn to the outside of the case 200.

Here, the electrode assembly comprises a third semiconductor material 125 between the first electrode lead 111a and the second electrode lead 113a. The third semiconductor material 125 may serve as an insulator to disconnect the first electrode lead 111a from the second electrode lead 113a when the temperature of the radical unit is maintained at a third set temperature or less and may change from the insulator to a conductor to connect the first electrode lead 111a to the second electrode lead 113a so that the first electrode lead 111a and the second electrode lead 113a are conducted with respect to each other when the temperature of the radical unit rises to the third set temperature or more, thereby generating short-circuit.

That is, the third semiconductor material 125 may connect or disconnect the first electrode lead 111a to/from the second electrode lead 113a according to the temperature variation of the radical unit 110. Accordingly, the temperature of the radical unit 110 may be prevented from rising to the third set temperature or more. As a result, the ignition or explosion due to thermal runaway of the radical unit 110 may be prevented.

Also, the third semiconductor material 125 may be made of a phase transition material.

Here, the third set temperature is higher than the second set temperature. For example, the third set temperature may be 100° C. to 110° C., preferably, 110° C. That is, the thermal runaway (degradation or breakage due to heat) occurs at a temperature of 100° C. to 110° C., preferably, 110° C. Thus, the third set temperature may be set to 100° C. to 110° C. to prevent the thermal runaway of the radical unit from occurring.

Therefore, the secondary battery 10 according to the second embodiment of the present invention may comprise the electrode assembly 100 provided with the safety unit 120 to prevent the temperature of the electrode assembly 100 from rising to the set temperature or more, thereby preventing the ignition and explosion.

Hereinafter, a use state of the secondary battery 10 according to the second embodiment of the present invention will be described.

First, when the secondary battery 10 is charged, a temperature rises as the radical unit 110 of the electrode assembly 100 accommodated in the case 200 is charged. Here, if the radical unit 110 of the electrode assembly 100 is overcharged, the temperature of the radical unit 110 rises rapidly. In this case, when the temperature of the radical unit 110 rises to the first set temperature of 60° C. to 80° C. or more, the rise in temperature of the radical unit 110 may be suppressed by the safety unit 120.

That is, in the safety unit 120, when the temperature of the radical unit 110 is maintained at the first set temperature or less, the first semiconductor material 122 may serve as the insulator to disconnect the radical unit 110 from the first safety plate 121, and when the temperature of the radical unit 110 rises to the first set temperature or more, the first semiconductor material 122 may change from the insulator to the conductor to connect the radical unit 110 to the first safety plate 121 so that the radical unit 110 and the first safety plate 121 are conducted with respect to each other. Therefore, the heat generated in the radical unit 110 may be conducted to the first safety plate 121 and then dissipated to the outside to suppress the temperature of the radical unit 110 to the first set temperature or more.

Also, when the temperature of the radical unit 110 rises to the second set temperature of 80° C. to 100° C. or more, the safety unit 120 suppresses again the rise in temperature of the radical unit 110 by using the second safety plate 123 and the second semiconductor material 124.

That is, when the temperature of the radical unit 110 rises to the second set temperature or more, the second semiconductor material 124 changes from the insulator to the conductor to connect the first safety plate 121 to the second safety plate 123 so that the first safety plate 121 to the second safety plate 123 are conducted with respect to each other, thereby dissipating the heat of the first safety plate 121 conducted to the second safety plate 123. That is, as the heat generated in the radical unit 110 is absorbed into the first safety plate 121 and the second safety plate 123 and then dissipated to the outside, the temperature is suppressed to the second set temperature or less to significantly prevent the radical unit 110 from being ignited and exploded.

Also, when the thermal runaway occurs due to the continuous rise in temperature of the radical unit 110, the safety unit 120 suppresses the rise in temperature of the radical unit 110 by using the third semiconductor material 125.

That is, when the temperature of the radical unit 110 rises up to the third set temperature of 100° C. to 110° C., the third semiconductor material 125 may change from the insulator to the conductor to connect the first electrode lead 111a to the second electrode lead 113a, which are provided in the radical unit 110, thereby generating the short-circuit from occurring in advance. Therefore, the voltage and temperature of the radical unit 110 may be reduced to suppress the rise in temperature of the radical unit 110, thereby preventing the ignition and explosion from occurring.

Also, a battery pack comprising the secondary battery according to the second embodiment may be archived.

[Battery Pack According to Third Embodiment of the Present Invention]

That is, a battery pack according to a third embodiment of the present invention comprises a secondary battery and a pack case that accommodates the secondary battery. Here, the secondary battery comprises an electrode assembly and a case that accommodates the electrode assembly.

The electrode assembly comprises a radical unit which comprises first and second electrodes stacked with a separator therebetween, wherein the first electrode 111 is stacked at the outermost side, and a safety unit which is disposed on the outermost surface of the radical unit.

The safety unit comprises a first safety plate disposed above the outermost surface of the radical unit and a first semiconductor material provided between the radical unit and the first safety plate.

The first semiconductor material may serve as an insulator at a first set temperature or less to disconnect the radical unit from the first safety plate and may change from the insulator to a conductor at the first set temperature or more to connect the radical unit to the first safety plate, thereby dissipating the heat of the radical unit while conducting the heat to the first safety plate.

Here, the secondary battery has the same constituent as the secondary battery described above in the second embodiment, and thus its duplicated descriptions will be omitted.

Thus, the battery pack according to the third embodiment may significantly improve the safety.

EXPERIMENTAL EXAMPLE

Germanium is prepared as a first semiconductor material according to the present invention, and then resistance values of the germanium are measured according to a temperature variation. As a result, a graph illustrated in FIG. 5 may be obtained.

Figure 5:
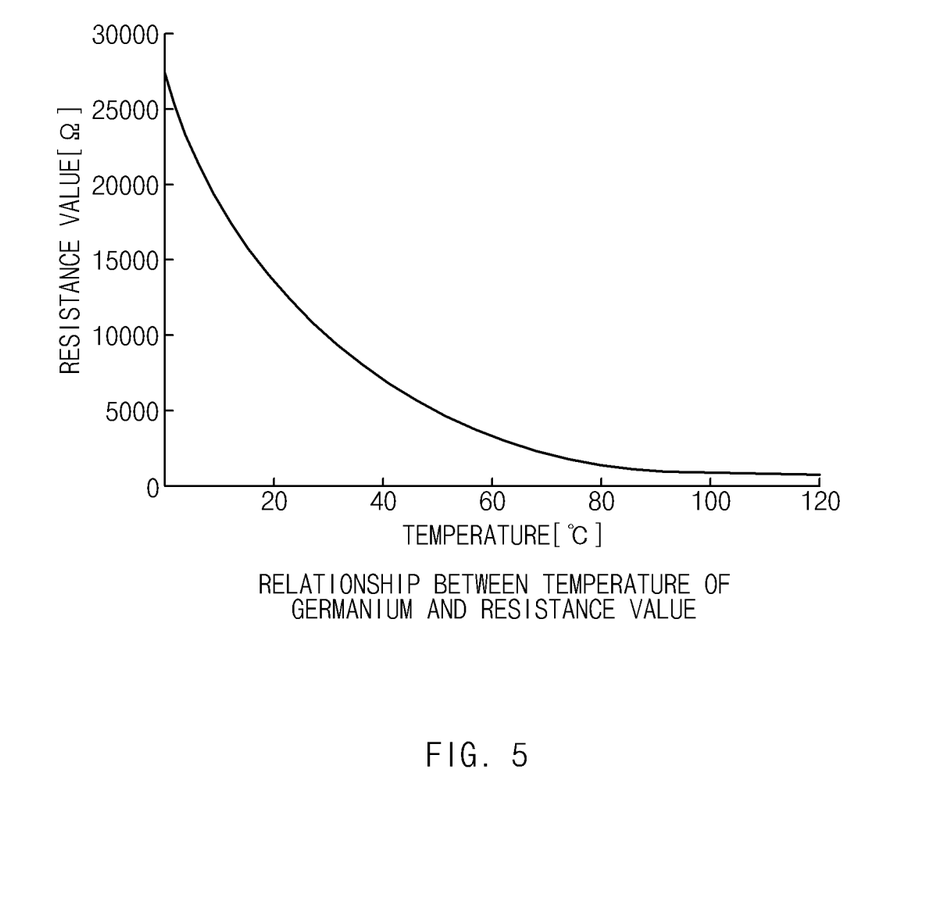
FIG. 5 is a graph showing an experimental example according to the present invention.

Referring to the graph of FIG. 5, the germanium has resistance of about $3500\Omega$ to $2000\Omega$ at a temperature of 60° C. to 80° C. That is, the germanium has high resistance at the temperature of 60° C. to 80° C. and thus exhibits characteristics as an insulator through which current does not flow. Also, the germanium has resistance of about $2000\Omega$ or less at a temperature of 80° C. or more. That is, the germanium has characteristics as a conductor through which current begins to flow at resistance of $2000\Omega$ or less. In other words, the germanium changes in property from the insulator to the conductor.

Thus, the first semiconductor material according to the present invention may be made of the germanium of which the resistance value changes according to the temperature variation to reduce the temperature of the radical unit according to the temperature variation of the radical unit.

The scope of the present invention is defined by the appended claims rather than the detailed descriptions, and it is possible to make various embodiments derived from the meaning and scope of the claims and their equivalents concept.

The invention claimed is:

1. An electrode assembly comprising:
a radical unit provided with first and second electrodes stacked with a separator therebetween, wherein the first electrode defines an outermost surface of the radical unit; and
a safety unit disposed on the outermost surface of the radical unit,
wherein the safety unit comprises: a first safety plate disposed above the outermost surface of the radical unit; and a first semiconductor material provided between the radical unit and the first safety plate,
wherein the first semiconductor material serves as an insulator at a first set temperature or less that electrically insulates the radical unit from the first safety plate, and the first semiconductor material is configured to change from the insulator to a conductor above the first set temperature that electrically connects the radical unit to the first safety plate, thereby dissipating heat of the radical unit while conducting the heat of the radical unit to the first safety plate.

2. The electrode assembly of claim 1, wherein the first set temperature is 60° C. to 80° C.

3. The electrode assembly of claim 1, wherein a planar surface of the separator has an area greater than an area of a planar surface of each of the electrodes,
a planar surface of the first semiconductor material has a same area as an area of a planar surface of the separator, and
a planar surface of the first safety plate has a same area as a planar surface of the first or second electrode.

4. The electrode assembly of claim 1, wherein the safety unit further comprises: a second safety plate disposed above the first safety plate; and a second semiconductor material provided between the first safety plate and the second safety plate,
wherein the second semiconductor material serves as an insulator at a second set temperature or less that electrically insulates the first safety plate from the second safety plate, and the second semiconductor material is configured to change from the insulator to a conductor above the second set temperature that electrically connects the first safety plate to the second safety plate, thereby dissipating heat of the first safety plate while conducting the heat of the first safety plate to the second safety plate.

5. The electrode assembly of claim 4, wherein the second set temperature is 80° C. to 100° C.

6. The electrode assembly of claim 4, wherein the first safety plate is made of an aluminum (Al) material, and the second safety plate is made of a copper (Cu) material.

7. The electrode assembly of claim 4, wherein the second semiconductor material has a same size as the first semiconductor material, and the second safety plate has a size greater than a size of the first safety plate and less than or equal to a size of the second semiconductor material.

8. The electrode assembly of claim 7, wherein the second safety plate has a thickness greater than a thickness of the first safety plate.

9. The electrode assembly of claim 1, wherein each of the first semiconductor material and the second semiconductor material is made of germanium or silicon.

10. A secondary battery comprising:
an electrode assembly; and
a case accommodating the electrode assembly therein,
wherein the electrode assembly comprises: a radical unit provided with first and second electrodes stacked with a separator therebetween, wherein the first electrode defines an outermost surface of the radical unit; and a safety unit disposed on the outermost surface of the radical unit,
wherein the safety unit comprises: a first safety plate disposed above the outermost surface of the radical unit; and a first semiconductor material provided between the radical unit and the first safety plate,
wherein the first semiconductor material serves as an insulator at a first set temperature or less that electrically insulates the radical unit from the first safety plate, and the first semiconductor material is configured to change from the insulator to a conductor above the first set temperature that electrically connects the radical unit to the first safety plate, thereby dissipating heat of the radical unit while conducting the heat of the radical unit to the first safety plate.

11. The secondary battery of claim 10, wherein the safety unit further comprises: a second safety plate disposed above the first safety plate; and a second semiconductor material provided between the first safety plate and the second safety plate,
wherein the second semiconductor material serves as an insulator at a second set temperature or less that electrically insulates the first safety plate from the second safety plate, and the second semiconductor material is configured to change from the insulator to a conductor above the second set temperature that electrically connects the first safety plate to the second safety plate, thereby dissipating heat of the first safety plate while conducting the heat of the first safety plate to the second safety plate.

12. The secondary battery of claim 10, wherein the electrode assembly comprises: a first electrode lead connected to the first electrode and having an end extending to an outside of the case; and a second electrode lead connected to the second electrode and having an end extending to an outside of the case, and
the electrode assembly further comprises a third semiconductor material extending between the first electrode lead and the second electrode lead, wherein the third semiconductor material serves as an insulator at a third set temperature or less that electrically insulates the first electrode lead from the second electrode lead, and the third semiconductor material is configured to change from the insulator to a conductor above the third set temperature that electrically connects the first electrode lead to the second electrode lead, thereby generating a short-circuit.

13. The secondary battery of claim 12, wherein the third set temperature is 100° C. to 110° C.

14. A battery pack comprising a secondary battery provided with an electrode assembly and a case accommodating the electrode assembly therein,
wherein the electrode assembly comprises: a radical unit provided with first and second electrodes stacked with a separator therebetween, wherein the first electrode defines an outermost surface of the radical unit; and a safety unit disposed on the outermost surface of the radical unit,
wherein the safety unit comprises: a first safety plate disposed above the outermost surface of the radical unit; and a first semiconductor material provided between the radical unit and the first safety plate, wherein the first semiconductor material serves as an insulator at a first set temperature or less that electrically insulates the radical unit from the first safety plate, and the first semiconductor material is configured to change from the insulator to a conductor above the first set temperature or that electrically connects the radical unit to the first safety plate, thereby dissipating heat of the radical unit while conducting the heat of the radical unit to the first safety plate.

* * * * *